United States Patent [19]
Cather, Jr.

[11] 4,126,316
[45] Nov. 21, 1978

[54] METHOD OF INSTALLING SHAFT SEAL WITH REFORMABLE SHELL

[75] Inventor: Douglas A. Cather, Jr., Gastonia, N.C.

[73] Assignee: Garlock Inc., Rochester, N.Y.

[21] Appl. No.: 792,818

[22] Filed: May 2, 1977

[51] Int. Cl.² .............................................. F16J 15/56
[52] U.S. Cl. ......................................... 277/1; 29/437; 29/520; 277/9
[58] Field of Search .................. 29/437, 520, 1, 9, 9.5, 29/190

[56] References Cited

U.S. PATENT DOCUMENTS

| 3,604,098 | 9/1971 | Goldberg | 277/9 |
| 3,675,933 | 7/1972 | Nappe | 277/9 |
| 3,778,881 | 12/1973 | Knapp | 277/9 |
| 3,825,271 | 7/1974 | Bellastio | 277/34.3 |

Primary Examiner—Robert I. Smith
Attorney, Agent, or Firm—Richard W. Watson

[57] ABSTRACT

A shaft seal with a reformable shell and a seal lip which can be readily installed over a roughened, enlarged or irregular portion of a shaft and then be reformed so that the sealing lip is brought into proper sealing engagement with the shaft.

6 Claims, 4 Drawing Figures

METHOD OF INSTALLING SHAFT SEAL WITH REFORMABLE SHELL

BACKGROUND OF THE INVENTION

1. Field of the Invention

This invention is concerned with shaft seals suitable for installation over an enlarged element without having to use special installation devices or tools and without damage to or excessive stretching of the seal element.

2. Description of the Prior Art

In the past, efforts to install seals over roughened or enlarged areas have been directed primarily to the use of special installation methods and tools rather than to new seal designs. The most common practice has been to employ a seal of standard design but stretched to an enlarged I.D. by means of a tapered hollow sleeve. The sleeve covers the enlarged portion on the shaft and the seal is pushed axially past the enlarged portion. The seal is pushed axially inwardly and then the installation sleeve is withdrawn axially outwardly thus permitting the seal lip to return to its original I.D. and thus into sealing engagement with the shaft. However, in some instances the degree of stretch has been excessive and the seal lip has been damaged. Such excessive stretch can result in a situation where the resilience of the seal lip is insufficient to maintain proper sealing contact with the shaft. In more extreme cases, the seal element may be stretched to the point of splitting. In those cases, a new seal must be substituted. Another problem which can be encountered is damage to the seal lip if there are any nicks or rough spots on the installation tool or sleeve.

Thus, it is an object of this invention to provide a seal which can be installed over a roughened or enlarged area without damage to the seal lip.

It is a further object to provide a seal which can be installed without the use of special installation tools.

Another object is to provide a seal with a deformable shell which is utilized to bring the seal lip into proper sealing engagement with the shaft.

Other objects will become apparent upon consideration of the following detailed description, the accompanying drawings and the appended claims.

SUMMARY OF THE INVENTION

This invention relates to a shaft seal having a free or as made sealing lip I.D. somewhat greater than the diameter of the shaft to be sealed. As the seal is inserted in a housing bore, a portion of the shell which supports the sealing lip is reformed and in turn reforms the sealing lip into proper sealing engagement with the shaft. Utilization of this invention permits installing a seal over a rough or unmachined shaft surface or over a splined area or other enlarged or irregular portion without having to stretch or otherwise deform the seal lip excessively. This invention is particularly useful where sealing lips are made of materials having reduced tensile strength and/or reduced resilience.

BRIEF DESCRIPTION OF THE DRAWINGS

A fuller understanding of the present invention will be gained by reference to the following detailed description when read in conjunction with the attached drawings in which.

DETAILED DESCRIPTION OF THE INVENTION

Figure 1:
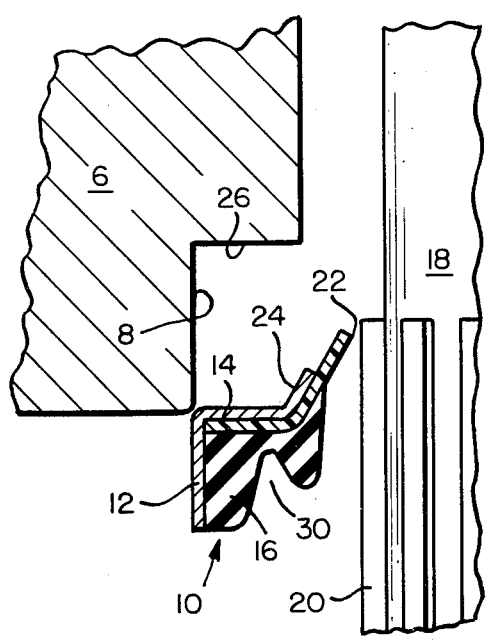
FIG. 1 is a partial sectional view of a preferred embodiment of a seal according to the invention and passing over an enlarged shaft portion.

In FIG. 1 of the drawings there is shown a preferred embodiment of the invention as it appears just before it is installed in a housing 6 with a bore 8. Seal 10 comprises a shell 12, a seal element 14 and resilient filler 16. A shaft with which the seal is to be associated is shown at 18 with an enlarged portion 20.

The first step in installation of a seal is to pass it over the end of shaft 18 and axially toward bore 8. The smallest diameter of seal 10 is at the seal lip 22 of seal element 14. However, that diameter is greater than the largest diameter of enlarged portion 20 on shaft 18.

Figure 2:
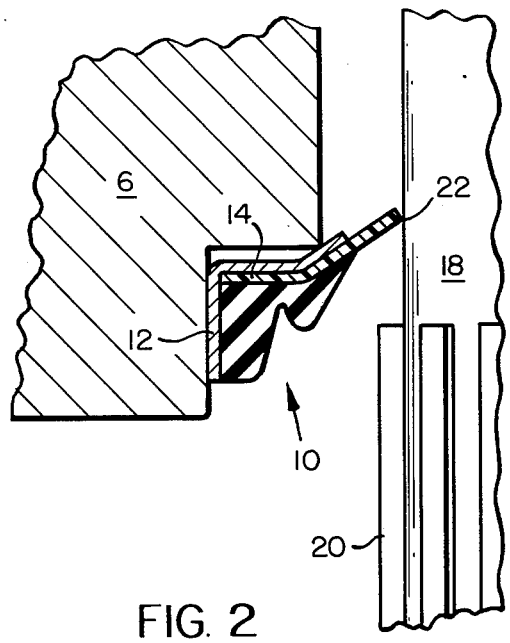
FIG. 2 is a partial sectional view of the seal of FIG. 1 partially installed in a housing bore.
Figure 3:
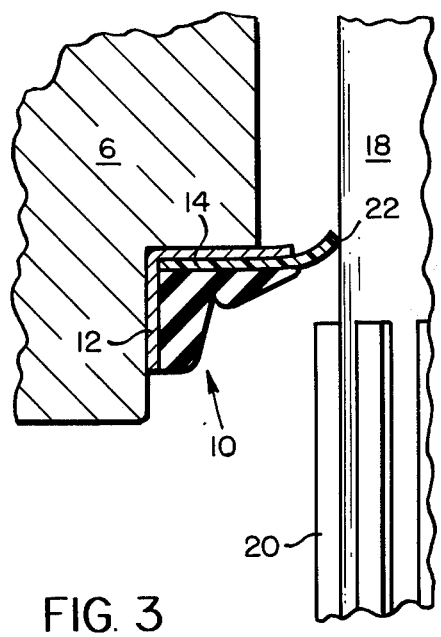
FIG. 3 is a partial sectional view of the seal of FIG. 1 fully installed in a housing bore.

As the seal shell 12 is pressed into housing bore 8, a reformable shell portion 24 contacts face 26 and begins to reform as shown in FIG. 2. As the seal shell is pressed further into the bore, portion 24 is reformed by bending inwardly from a generally oblique orientation as shown in FIG. 1 toward a generally radial position as shown in FIG. 3. As the portion 24 is bent inwardly, the seal lip 22 of seal element 14 comes into contact with shaft 18 as shown in FIG. 2. Then as portion 24 continues to be bent inwardly, seal element 14 is reformed to a curved or oblique configuration as shown in FIG. 3. Resilient filler 16 is bonded to the shell 12 and seal element 14, thus uniting all the elements of seal 10. Filler 16 is formed with a recess 30 which permits the radially inner portion to be displaced from its position as shown in FIG. 1 to the position shown in FIG. 3 without excessive compressive stresses being exerted on the filler.

The seal shell 12 is preferably of metal, as for example steel, aluminum or brass, and is made with an O.D. slightly greater than bore 8 so that upon installation, the seal 10 will be retained in bore 8 by a press fit. The degree of interference necessary increases according to overall seal diameter and is well known to those skilled in the shaft seal art. The seal element 14 is preferably of plastic resin or elastomeric material as for example polytetrafluoroethylene (hereinafter PTFE) or nylon resins or nitrile or neoprene elastomers. Whatever basic seal element materials are used, they may be compounded with one or more fillers to help obtain desirable operating characteristics. Seals according to the invention will be found particularly useful for seals in which the seal element is wholly or partially of PTFE or of an elastomeric material with low tensile strength such as silicone elastomer. Resilient filler 16 is preferably made of elastomeric material, compounded for ready bonding to both shell 12 and seal element 14. Specific materials which may be suitable are nitriles, neoprenes and fluoroelastomers.

Figure 4:
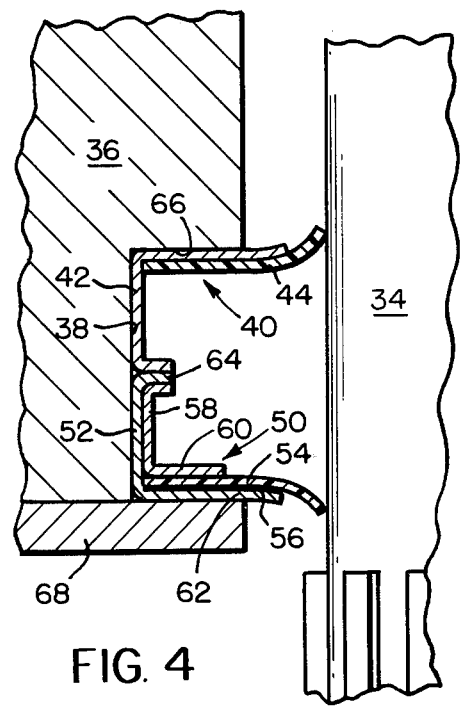
FIG. 4 is a partial sectional view illustrating two additional preferred embodiments of the invention fully installed in a machine housing.

In FIG. 4 there are illustrated two further embodiments of the invention installed in a housing bore and sealingly engaging a shaft 34. Housing 36 having a bore 38 is shown with two seals 40 and 50 installed therein. Seal 40 comprises a shell 42 and a seal element 44 bonded directly to shell 42. Thus, there is no need for a resilient filler to correspond to filler 16 as shown in FIGS. 1-3. Seal 50 comprises a shell 52, a seal element 54, a gasket 56 and an inner shell 58. Gasket 56 provides a static seal to prevent leakage through the seal itself. Flange 60 of inner shell 58 clamps seal element 54 and gasket 56 against the generally radial portion 62 of shell 52. Inner shell 58 is held in proper position by a rolled over portion 64 of shell 52. Gasket 56 may be of any suitable gasketing material such as elastomers, plastics, fibrous sheets and the like. Shell 58 is preferably of metal and would normally be of the same material as shell 52.

In those instances when the seal shell cannot be reformed by pressing against the bottom of the housing bore, as at 66, other means must be provided to reform the shell and thus, the seal element. Accordingly the originally reformable portion 62 of shell 52 is reformed by pressure applied by plate 68 as it presses the seals into final position. It is understood that FIG. 4 shows seals in operating position in a manner similar to that of FIG. 3. It will also be understood that the method of installing the seals of FIG. 4 will be essentially equivalent to the sequence illustrated in FIGS. 1-3 and need not be repeated here.

It should be noted that FIG. 4 shows two embodiments in the same installation as a matter of convenience. In actual practice, where two or more seals are used, it would be more likely that they would all be of the same embodiment. Also, while the seals 40 and 50 of FIG. 4 are shown respectively as having lips facing inwardly and outwardly, operating conditions may be encountered where the seal lips would preferably face in the same direction.

In order to make it easier to install seals according to this invention and particularly to make it easier to reform the seal shell and the seal lip, the shell can be reduced in thickness at the intended flex point. Such a thickness reduction may be accomplished by stamping or machining or any other suitable method.

While a number of preferred embodiments of the present invention have been shown and described in detail, a variety of further modifications will occur to those skilled in the art. For example, the lip design may be varied and may incorporate hydrodynamic pumping elements. Also, under some conditions, it may be desirable that the lips be spring loaded to ensure proper sealing engagement with the shaft. Under other conditions, a seal element of at least partially frustoconical form may be utilized without a reformable shell. Under such conditions, the bottom of the housing bore would also serve as means for reforming the seal element and other means would be provided to retain the seal element in its operating position. It is also to be noted that while the illustrated seal lips are shown sealing on the surface of an axially extending shaft, the sealing surface may be somewhat frustoconical or arcuate or even radially extending. Thus, the preceding specification should be interpreted as exemplary rather than as limiting and the scope of the invention is defined by the following claims.

I claim:

1. A method of installing a shaft seal in a machine housing after passing said seal over an obstruction on a shaft comprising:
   (a) providing annular seal means with a resilient reformable seal element having a sealing lip with an as formed I.D. greater than the maximum O.D. of said obstruction,
   (b) passing said seal means axially over said obstruction,
   (c) reforming at least a portion of said seal element by engagement with a portion of said machine housing during installation in said housing to reduce the I.D. of said sealing lip, thus
   (d) causing said sealing lip to sealingly engage said shaft.

2. The method according to claim 1 wherein said seal means includes a seal shell with a reformable portion and said reforming step includes reforming said reformable portion of said shell.

3. The method according to claim 2 wherein said reforming step includes pressing said reformable portion of said seal means axially into a machine housing and against a generally radial portion of said machine housing, and reforming at least a portion of said seal shell from a partially axial orientation to a generally radial orientation.

4. A method of installing a shaft seal in a machine housing comprising:
   (a) providing annular seal means with a resilient seal element having a reformable portion including a sealing lip with an as formed diameter greater than its intended operating diameter,
   (b) pressing said seal means axially into a bore in said machine housing, and
   (c) reforming at least a portion of said seal element by engagement with a portion of said machine housing during installation in said housing to reduce the diameter of said sealing lip to its intended operating diameter in sealing engagement with a shaft to be sealed.

5. The method according to claim 4 wherein said seal means includes a seal shell with a reformable portion and said reforming step includes reforming said reformable portion of said shell.

6. The method according to claim 5 wherein said reforming step includes pressing said reformable portion of said seal means against a generally radial portion of said machine housing and reforming at least a portion of said seal shell from a partially axial orientation to a generally radial orientation.

* * * * *